(12) United States Patent
Savir et al.

(10) Patent No.: US 11,269,541 B2
(45) Date of Patent: Mar. 8, 2022

(54) EFFICIENT UTILIZATION OF STORAGE RESOURCES ON DATA RECOVERY SITES USING MACHINE LEARNING

(71) Applicant: EMC IP Holding Company LLC, Hopkinton, MA (US)

(72) Inventors: Amihai Savir, Sansana (IL); Avitan Gefen, Tel Aviv (IL); Kfir Wolfson, Beer Sheva (IL); Itay Azaria, Dimona (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 323 days.

(21) Appl. No.: 16/662,603

(22) Filed: Oct. 24, 2019

(65) Prior Publication Data

US 2021/0124492 A1    Apr. 29, 2021

(51) Int. Cl.
*G06F 3/06* (2006.01)
*G06F 11/14* (2006.01)
*G06N 20/00* (2019.01)
*G06F 17/18* (2006.01)

(52) U.S. Cl.
CPC ............ *G06F 3/065* (2013.01); *G06F 3/064* (2013.01); *G06F 3/0631* (2013.01); *G06F 11/1469* (2013.01); *G06F 17/18* (2013.01); *G06N 20/00* (2019.01); *G06F 3/067* (2013.01)

(58) Field of Classification Search
CPC .......... G06F 3/065; G06F 3/0631; G06N 5/00
USPC ....................................................... 711/162
See application file for complete search history.

(56) References Cited

U.S. PATENT DOCUMENTS

| | | | |
|---|---|---|---|
| 2018/0173720 A1* | 6/2018 | Lord | G06F 16/1815 |
| 2018/0203630 A1* | 7/2018 | Waldspurger | H04L 43/08 |
| 2019/0370043 A1* | 12/2019 | Olderdissen | G06F 3/0673 |
| 2019/0377507 A1* | 12/2019 | Srivastava | G06F 3/0653 |
| 2020/0050380 A1* | 2/2020 | Srivastava | G06F 3/0631 |

* cited by examiner

*Primary Examiner* — Than Nguyen
(74) *Attorney, Agent, or Firm* — Staniford Tomita LLP

(57) ABSTRACT

Embodiments for dynamically allocating journal space for Do streams across multiple applications. A shared Do stream process has a dynamic block allocation component that provides a certain amount of buffering of a data flush for an application, using space that would normally be allocated for, but unused by, other applications, thus preventing the need for one or more of the applications to move to fast-forward mode when possible. Certain machine learning techniques are used in order to predict the required Do stream for each application according to past experience with the application, and this prediction is used to intelligently allocate Do Streams between the different applications.

20 Claims, 13 Drawing Sheets

EFFICIENT UTILIZATION OF STORAGE RESOURCES ON DATA RECOVERY SITES USING MACHINE LEARNING

TECHNICAL FIELD

Embodiments are generally directed to continuous replication systems, and more specifically to dynamically allocating journal space among applications during fast-forward replication.

BACKGROUND

In data storage systems, a continuous replication process is used to create a copy of the data in a directory on a first storage device and transfer it to a directory on a second storage device. Continuous replication typically takes the latest changes to data and replicates them without requiring scheduling into an existing backup job.

One of the present challenges in continuous replication is how to deal with applications that flush large amounts of data at once, but have traffic patterns that are normally low and quiet. Examples for such applications are in-memory databases (e.g., SAP-HANA), and applications which perform calculations creating data and persist it periodically. The challenge in these cases is a storage resource requirement and need for larger replication journals, specifically space for the journals' "Do Stream", which is used to buffer input/output transfers (I/Os). In cases where there is not enough storage space available, some modern replication systems (e.g., Dell EMC RecoverPoint for VMs (RP4VMs)), can switch to a "fast forward" (FF) replication mode, which requires less storage and compute resources at the expense of losing the application's any-point-in-time journal.

It would be advantageous to maintain the any-point-in-time journal even during a fast forward replication mode. What is needed, therefore, is a method and system to prevent the loss of the any-point-in-time journal by dynamically allocating journal space for Do Streams across multiple applications.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
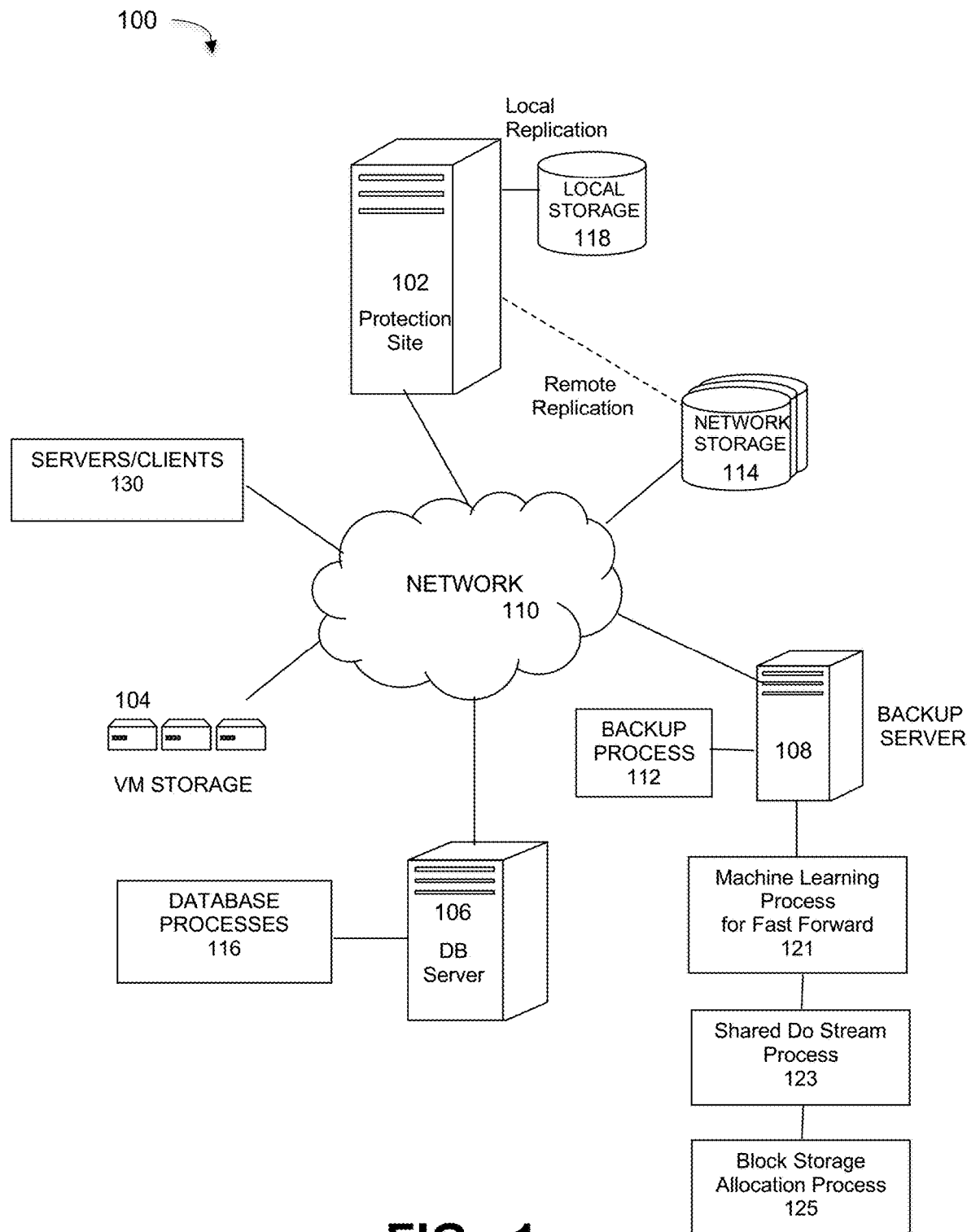
FIG. 1 illustrates a large-scale network implementing a continuous replication process using machine learning to predict large data flushes, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Some embodiments of the invention involve large-scale IT networks or distributed systems (also referred to as "environments"), such as a cloud network system or very large-scale wide area network (WAN), or metropolitan area network (MAN). However, those skilled in the art will appreciate that embodiments are not so limited, and may include smaller-scale networks, such as LANs (local area networks). Thus, aspects of the one or more embodiments described herein may be implemented on one or more computers in any appropriate scale of network environment, and executing software instructions, and the computers may be networked in a client-server arrangement or similar distributed computer network.

Embodiments include systems and methods that prevent the loss of the any-point-in-time journal by dynamically allocating journal space for Do Streams across multiple applications. This allows buffering of the data flush, using space that would normally be allocated for, but unused by, other applications, and allows the system to avoid moving to fast forward replication mode in many cases. The process also reduces the typical total storage requirements for replicating multiple applications. It uses certain machine learning (ML) techniques in order to predict the required Do stream for each application according to past experience with the application, and use the prediction to intelligently allocate Do Streams between the different applications.

FIG. 1 is a diagram of a network implementing a continuous replication process using machine learning to predict large data flushes and advance fast forwarding, under some embodiments. FIG. 1 illustrates an enterprise data protection system that implements data backup processes using storage protection devices, though embodiments are not so limited. For the example network environment 100 of FIG. 1, a protection site 102 has source data that is to be replicated in the system. The source data can be transferred to local storage 118 through local replication processes and/or remote or network (off-site) storage 114 through remote replication processes.

A backup server 108 executes a data replication or similar backup management process 112 that coordinates or manages the backup of data from one or more data sources, such as the protection site 102, database servers 106, or other servers/clients 130 to storage devices, such as network storage 114 and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114.

The network server computers are coupled directly or indirectly to the target VMs, and to the data sources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage, e.g., 118. The storage devices represent protection storage devices that serve to protect the system data through the backup process. Thus, backup process 112 causes or facilitates the backup of this data to the storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source (e.g., DB server 106) may be any appropriate data, such as database data that is part of a database management system 116, and the data may reside on one or more hard drives for the database(s) in a variety of formats. Database processes 116 represent only one type of application that may be supported by system 100, and many other applications, such as data gathering, large scale calculations, and so on, may also be supported.

For the embodiment of FIG. 1, backup server 108 also executes a machine learning process for fast forward mode, 121. This processing component uses certain machine learning techniques to predict when large data flushes to a storage device will occur and invoke fast forward mode in advance in order to eliminate redundant write operations and save system resources.

System 100 of FIG. 1 also includes a shared Do stream process or component 123 that dynamically allocates journal space for Do streams across multiple applications. The shared Do stream process has a dynamic block storage allocation component 125 that provides a certain amount of buffering of a data flush for an application, using space that would normally be allocated for, but unused by, other applications, thus preventing the need for one or more of the applications to move to fast-forward mode when possible. The machine learning process 121 is used to predict the required Do stream for each application according to past experience with the application, and this prediction is used to intelligently allocate Do Streams between the different applications. Processes or components 123 and 125 may be provided as separate processes, or they may be integrated into a single functional component, either separate from or further integrated with the FF mode machine learning process 121.

Although embodiments are described and illustrated with respect to certain example implementations, platforms, and applications, it should be noted that embodiments are not so limited, and any appropriate network supporting or executing any application may utilize aspects of the machine learning process for fast forward advance as described herein. Furthermore, network environment 100 may be of any practical scale depending on the number of devices, components, interfaces, etc. as represented by the server/clients 130 and other elements of the network. For example, embodiments are not limited to applications running on virtual machines, (which RP4VMs protects), but may also be implemented in other runtime environments such as physical servers, containers, and so on.

As stated above, the data generated or sourced by system 100 and transmitted over network 110 may be stored in any number of persistent storage locations and devices, such as local client storage, server storage, or other network storage.

Figure 2:
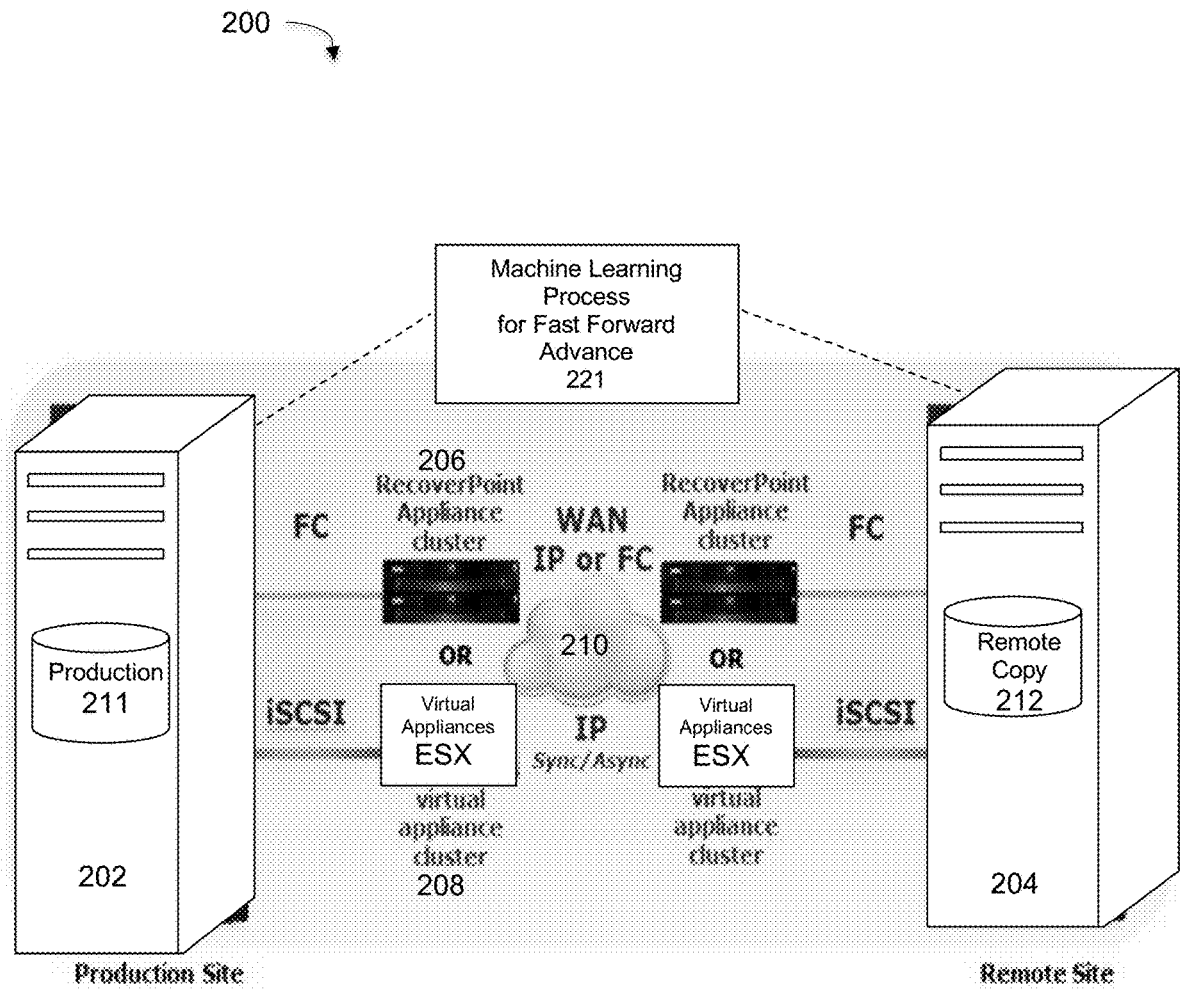
FIG. 2 illustrates a RecoverPoint-type system implementing a continuous replication process using machine learning to provide efficient storage utilization, under some embodiments.

FIG. 2 illustrates a RecoverPoint-type system that implements a machine learning process for fast forward advance, under some embodiments. The RecoverPoint system 200 protects virtual machines at VM level granularity with local and remote replication for recovery to any Point-in-Time (PiT) on premises, and supports synchronous and asynchronous replication over any distance with efficient WAN bandwidth utilization, substantially reducing network costs. RecoverPoint for VMs simplifies disaster recovery (DR), DR testing and operational recovery with built-in orchestration and automation capabilities directly accessible from a VMware vCenter. It provides a reliable and repeatable automated DR workflow that increases customer's data protection and recovery operational efficiencies. The RecoverPoint system represents is a fully virtualized software solution deployed in VMware vSphere, or similar, environments. Certain architectural components (not shown) are fully integrated and deployed in a VMware ESXi server environment: the VMware vCenter plug-in, a RecoverPoint write-splitter embedded in vSphere hypervisor, and a virtual appliance.

For the embodiment of FIG. 2, a production site 202 having production data stored in one or more local storage devices 211 is replicated remotely over network 210 to remote site 204, which has a remote copy storage device or array 212. The production data 211 may also be stored separately to the production server 202 and RecoverPoint provides for concurrent local and remote data replication to provide continuous data protection for any point-in-time recovery. As such, the system supports local replication, remote replication, and concurrent local and remote replication.

For the embodiment of FIG. 2, RecoverPoint appliances (RPA) 206 or virtual appliances 208 running in and ESX environment manage the replication setup and operations, compressing the data with advanced algorithms for efficient bandwidth utilization that reduces network cost up to 90%. Such a system generally supports concurrent local and remote replications over any distance through network 210, synchronous or asynchronous, and over fibre channel (FC) or iSCSI links, as shown. Certain management GUIs (graphical user interfaces), physical 206 or virtual 208 appliances, and write-splitters may be embedded in storage arrays. System 200 may be scaled up to provide multi-site support with 1:n fan-out replication for higher protection and test operation. It may also be scaled to provide n:1 fan-in for centralized DR site protection for multiple branch offices.

Although the description may be directed to replicated applications running on virtual machines (which RP4VMs protects), embodiments are not so limited and can also apply to other runtime environments such as physical servers, containers, and so on.

Modern replication systems such as RecoverPoint or other VM based systems use a remote journal for saving data and metadata on the I/O (input/output) stream. In general, a remote journal is a chronological record of changes made to a set of data. It provides a means to reconstruct a previous version of the set of data. With respect to block-level continuous replication journals, the journal process replicates block devices and keeps the I/O metadata. The journal contains a "Do" stream for new incoming I/Os and an "Undo" stream which saves the history. The Undo stream keeps track of the data being overwritten, as new I/Os from the Do stream are written to the replica disk.

System 200 thus uses a journal-based implementation to hold the point-in-time information of all changes made to the protected data. A defined replication policy can be used to support a short RPO (recovery point objective) via journal technology that delivers DVR like roll back in time capability to a selected point-in-time for recovery just seconds before data corruption occurred, reversing the error. The data may further be protected by a consistency group, preserving order consistency across the volumes contained within it. A journal, consisting of dedicated journal volumes, is assigned to each group copy to maintain the point-in-time roll back capability otherwise known as a protection window. RecoverPoint is designed to ensure recovery consistency for one application or interdependent applications using a single or separate consistency group as part of a group set.

Figure 3:
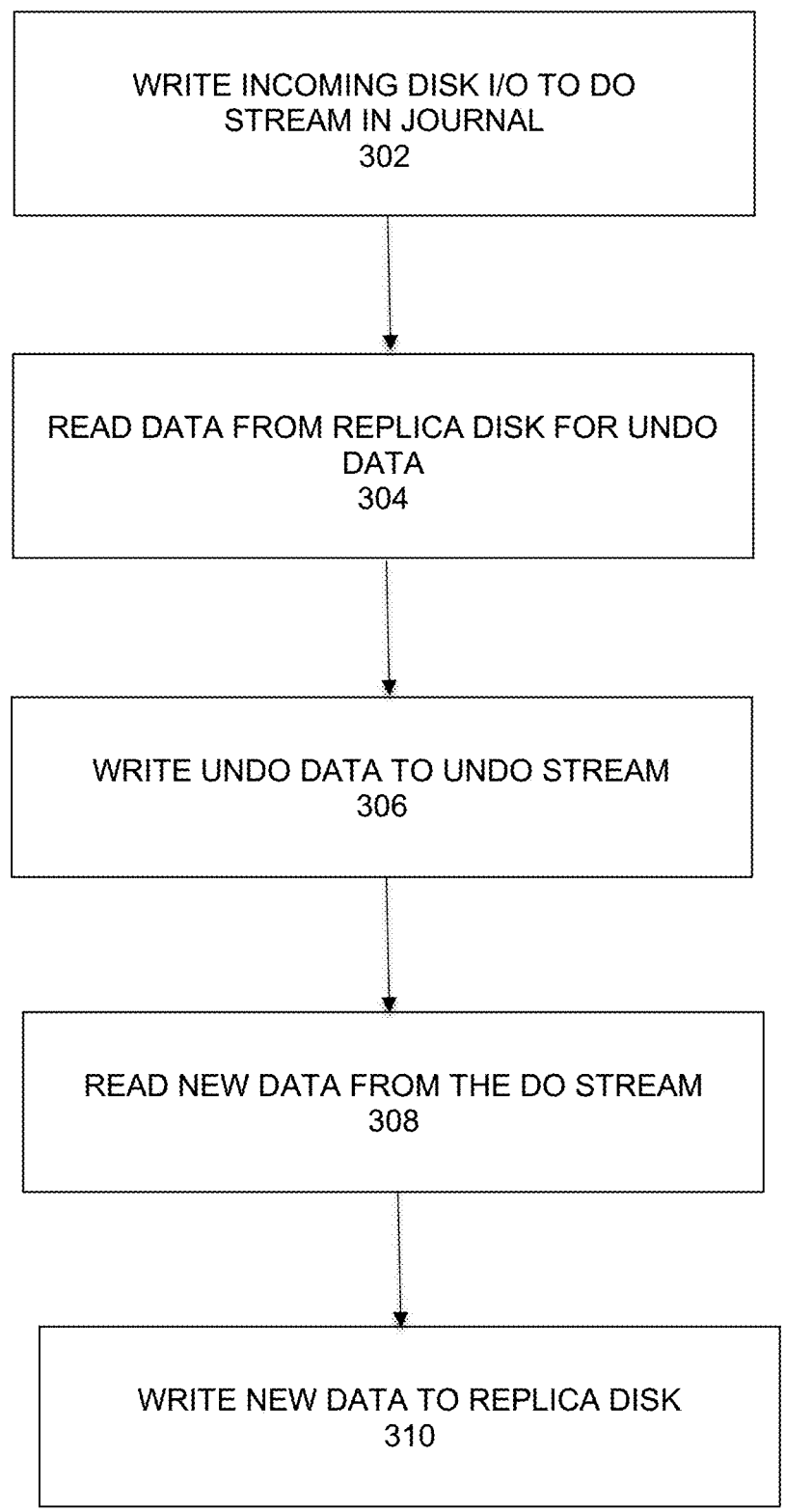
FIG. 3 is a flowchart that illustrates a five-phase replication process that is adaptable to use machine learning to provide efficient storage utilization, under some embodiments.

In an embodiment, the replication process comprises a five-phase replication process that uses the Do and Undo streams. FIG. 3 is a flowchart that illustrates a five-phase replication process that is adaptable to use machine learning to provide efficient storage utilization, under some embodiments. As shown in FIG. 3, the classic five-phase replication process begins with a write of the incoming I/O to (disk_x, offset_y) to the Do stream in the journal, step 302. The process then reads data from the replica disk, which was previously on disk_x, offset_y. This data is called the Undo data, step 304. The Undo data is then written to the Undo stream, step 306. The process then reads the new data written in step 302 from the Do stream, 308, and writes this new data to the replica disk, step 310.

For the process of FIG. 3, steps 304 to 310 are done asynchronously after step 302 so as to not block the incoming I/O stream threads processed in step 302. Once a piece of data has been read from the Do stream, its space is marked as free, so that it can be reused by a new incoming I/O. Metadata, such as timestamps of each I/O, are also saved in the journal to allow future access to a disk state at specific points in time. After the process of FIG. 3 is complete, the system has any point-in-time replication capability for the I/O written to disk_x, offset_y, because the journal contains the previous data in the Undo stream.

The size of the I/O in step 302 may vary depending on application. It may also be subdivided into different chunks or lengths for processing within the process 121. For example, it is divided into 0.5 KB blocks and efficiently treated at block resolution, but other sizes are also possible.

Large flushes of data generate large numbers of incoming I/Os (as may be encountered in step 302). Since steps 304 to 310 take much longer than just writing the incoming I/Os, the thread that performs these steps might not be able to keep up with the multitude of incoming data (i.e., all the I/Os generated by step 302). This causes the Do stream to fill up very quickly. In this case, the reading of new data (step 308), which removes an item from the Do stream does not happen as often as step 302. This causes a backup in the process.

To alleviate this issue, replication systems, such as system 200 in FIG. 2 use a three-phase replication process that incorporates a fast forward (FF) mode. Thus, when the Do stream is about to fill up, in order to continue keeping track of new I/Os, such a system may move to fast forward mode in which steps 304 and 306 of the five-phase process are skipped. The Undo data is not retained, it is simply overwritten by the new data from steps 308 and 310. Since the replication operation does not have this Undo data, all previous journal entries become invalid. For this reason, the entire history is discarded when there is a move to fast forward mode. When the system exits fast forward mode, the journal will start filling back up with any-point-in-time snapshots.

Figure 4:
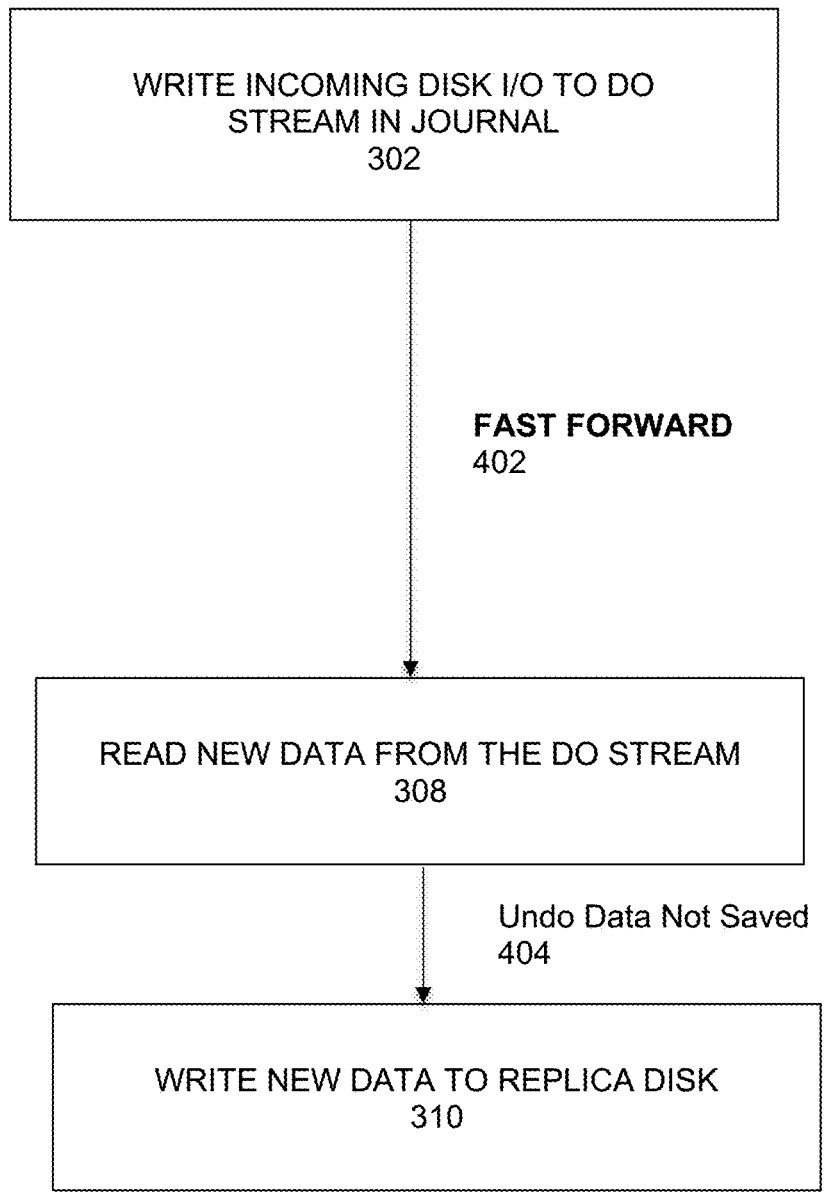
FIG. 4 is a flowchart that illustrates the fast forward mode used in a machine learning process for efficient data storage, under some embodiments.

FIG. 4 is a flowchart that illustrates the fast forward mode used in a machine learning process for efficient data storage, under some embodiments. As shown in FIG. 4, the write of incoming disk I/Os, step 302 is followed immediately by the read of new data, step 308 after invoking the fast forward mode 402. In this mode, the undo data is not saved 404. The new data read step thus essentially causes an overwrite of any undo data before or as the new data is written to the replica disk, step 310.

When in five-phase replication mode and an I/O burst starts while the Do stream still has free space, the system will continue to update the Undo stream until the Do stream is full. This can take several minutes and basically performs redundant write operations that could negatively affect the disk life time and the performance of the entire system (including other protected applications as well).

As shown in FIG. 4, the fast forward mode eliminates the Undo operations, but redundant writes to the Undo stream may still be are incurred when replicating large flushes. When replicating large flushes, the system will first write massive amounts of data to the Undo stream, and only when detecting that the DO stream is full, will it switch to fast forward mode and push out all the data points from the Undo journal. This essentially deletes the entire Undo stream. This results in redundant writes to the Undo stream, which take resources from other applications. The redundant steps performed in five-phase distribution use up memory, CPU, network traffic and storage IOPs (I/O operations) and throughput, which other applications cannot use at the same time. In some situations other protected applications might move into fast forward mode due to lack of resources, which means journal losses that could have been avoided. The redundant writes also lead to shorter storage life times. The amount of write operations affects the life of disk drives, especially in flash drives, which have finite read/write cycle, and writing a lot of unnecessary data chunks obviously reduces disk life times.

Near Real-Time Data Collection

In an embodiment, an analytics module is used for predicting the status of each asset across time as well as the total environment status in terms of storage utilization across time. The module discovers trends and seasonality patterns in the usage of different assets. It takes into account the historical data on each asset separately as well as the historical data of the environment as a whole.

Figure 5A:
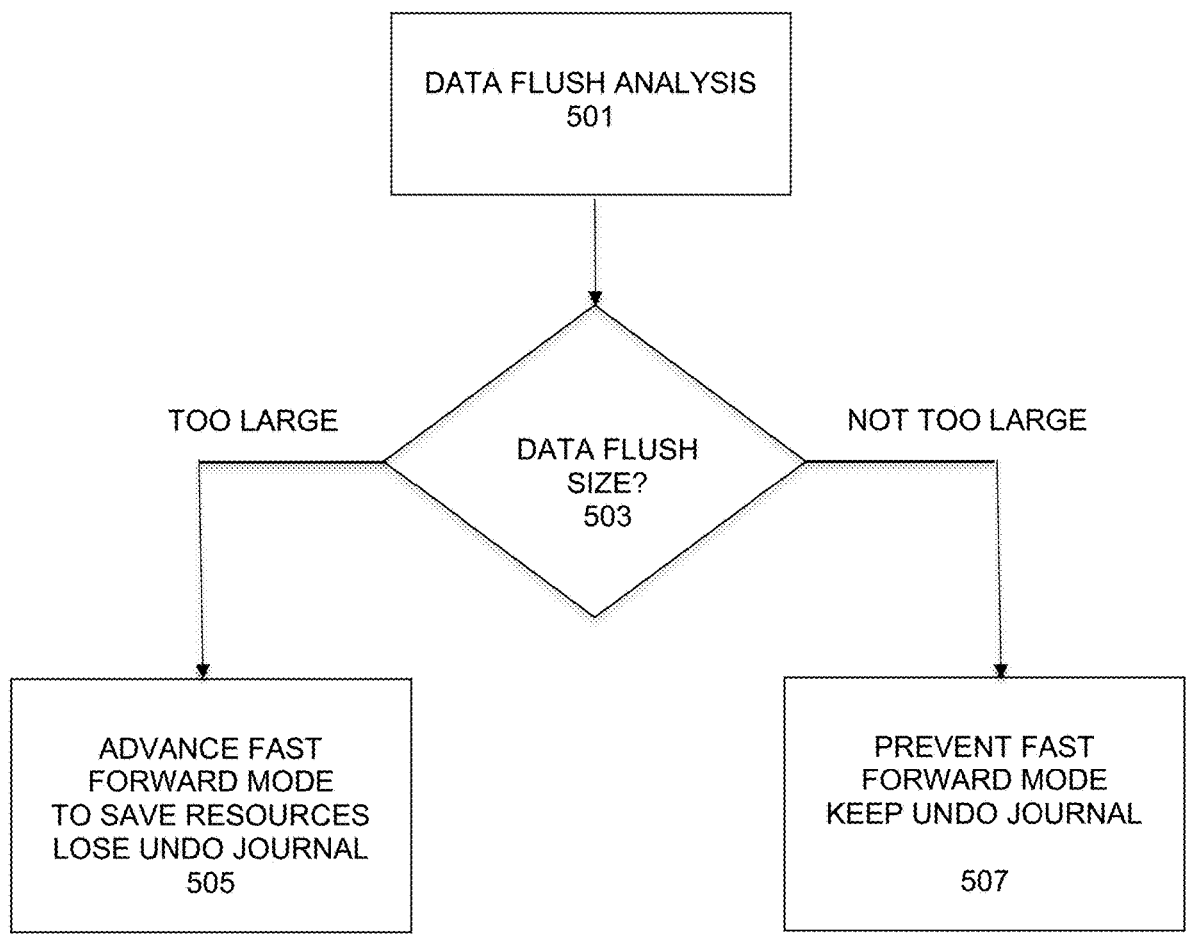
FIG. 5A illustrates a data flush size analysis process that advances fast forward mode or not depending on the forecasted size.

In an embodiment, the machine learning process 221 includes a processing component for analyzing and forecasting, with high confidence, the size of next data flush, in order to verify in advance if the next flush can be handled with the journal storage space that exists. FIG. 5A illustrates a data flush size analysis process that advances fast forward mode or not depending on the forecasted size. The forecasted data flush size is determined in analysis step 501. In case the data flush is too large, as determined in step 505, the system will not invest resources and switch to fast forward mode in advance, 505. If the flush is not too large, the system will not switch to fast forward mode and save the Undo journal, step 507.

The factor of "largeness" with respect to the data flush size is generally related to certain system characteristics, such as journal size, data throughput, processing speed, data load conditions, and other relevant or applicable parameters. It may also depend on the data source. For example, single applications within the system may not ever foreseeably generate too much data, however two or more applications at a time may together cause a large data flush. Also, a VM, such as in system 100 can contain several applications and operating systems. Typically, a data flush occurs from one application at a time, but certain usage or synchronicity patterns may also cause a predictable large data flush in certain conditions. Such conditions may be detected through extensive analysis of historic data. Embodiments include tools to detect such conditions to predict potential large scale data flushes.

In an embodiment, the analysis step 501 uses a forecasting process that uses elements of artificial intelligence (AI) and machine learning (ML) modes to learn patterns of the replication traffic and the journal Do stream consumption over time. These models provide the ability to forecast when the next data flush is going to happen and change the operation mode into fast forward to avoid potential inefficiencies.

Figure 5B:
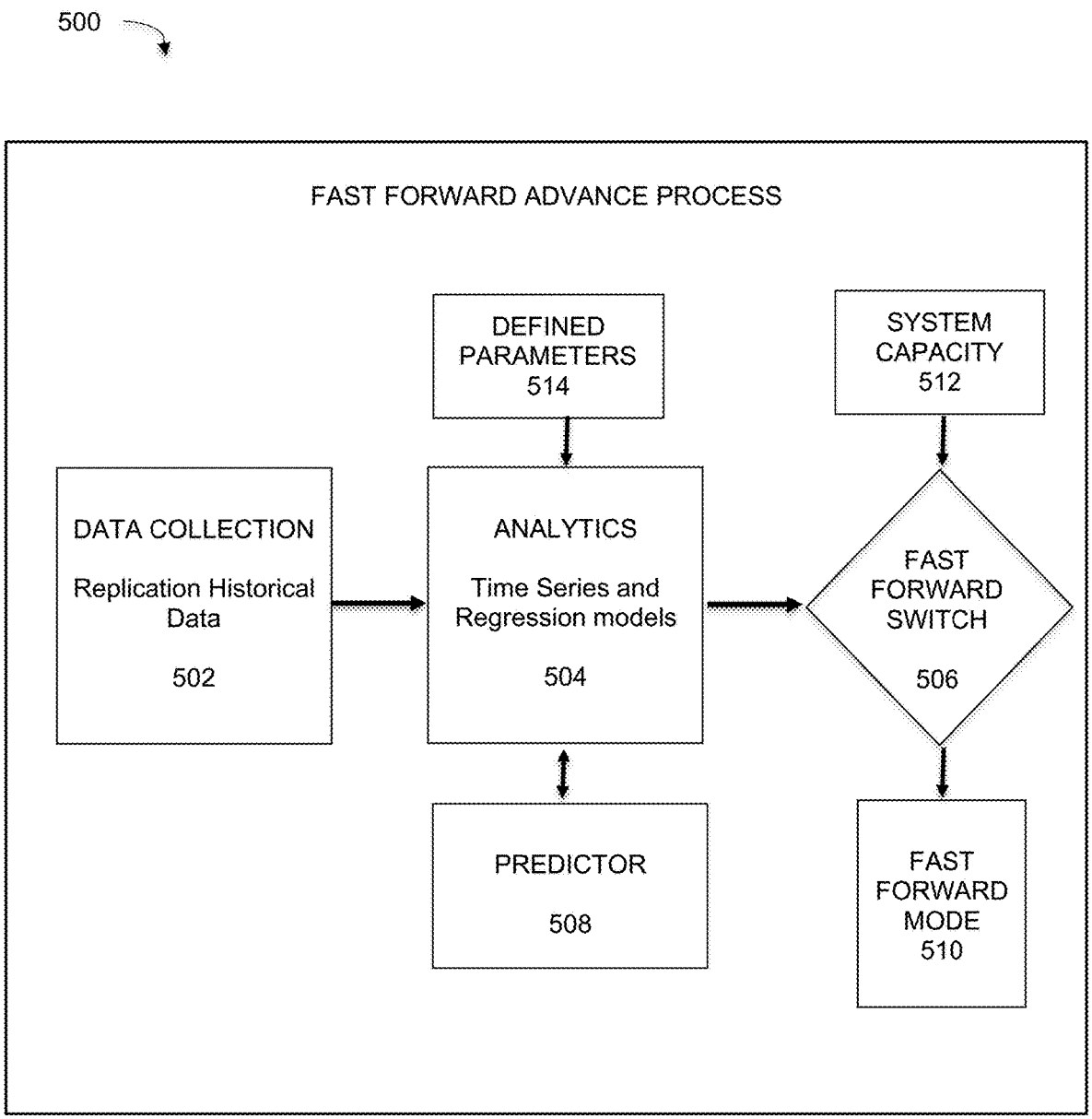
FIG. 5B illustrates embodiments of a fast forward advance process that includes certain processing elements.

Embodiments include a fast forward advance process that includes certain processing elements as shown in FIG. 5B. These include: (1) a near real time data collection mechanism, 502; (2) a bucket of analytical modules that are applied over the historical data points and allows accurate forecasting (i.e., model competition), 504; and (3) a fast forward decision switch, 506. The process 500 will enable data protection products for replication to improve performance in the replication process even when large data flushes occurs and to fully utilize the storage layer of the product. In addition, it can help extend the life of storage arrays as well as provide better performance experience through a reliable forecasting mechanism.

The near real time data collection mechanism, 502, comprises an interface to receive updates from the system assets regarding their respective usage data. Known data collection methods are used to receive and tabulate this data. In general, many storage and protection assets send periodic (e.g., daily) state updates to their manufacturers (e.g., ASUP data/SYR data, and so on). In other cases, data collecting agents are deployed for collecting data from those assets (e.g. data protection appliance agents). The collected data contains relevant information about the usage and utilization of the system assets. It is then parsed and stored in a centralized data store for analysis.

The analytics module 504 is used for predicting the status of each asset across time as well as the total environment status in terms of utilization across time. The module discovers trends and seasonality patterns in the usage of different assets. It takes into account the historical data on each asset separately as well as the historical data of the environment as a whole. Prediction of utilization (numeric) is done by a predictor unit 508 by using time-series models as well as linear regression models. The models are fitted to a given training dataset, then validated and evaluated on a given test dataset. There is no gold standard model-type in forecasting. Different time-series models can relate to different forecasting models that describes them the best. The main challenge is to find the model that best describes the data, i.e., minimize the error function outcome. Embodiments address this by developing a bucket of models. The best performing model is chosen for the specific prediction task. This methodology increases overall accuracy compared to any single model-type that can be used.

In an embodiment, the time-series model may take input from various different factors to determine a final model. For example, different applications may be the source of data that is flushed by the production site 202, or different sources within production site may generate the data to be replicated. In such a case, some applications or sources may routinely generate large amounts of data, or they may be of higher or lower priority than others. Likewise, some applications may be shared among users and generate large amounts of data when all users are involved. These characteristics can be factored into the model or models within the bucket of models.

With respect to the bucket of models embodiment, in statistics and machine learning, ensemble methods use multiple learning algorithms to obtain better predictive performance than could be obtained from any of the constituent learning algorithms alone. Unlike a statistical ensemble in statistical mechanics, which is usually infinite, a machine learning ensemble consists only of a concrete finite set of alternative models, but typically allows for much more flexible structure to exist among those alternatives. A "bucket of models" is an ensemble technique in which a model selection algorithm is used to choose the best model for each problem. When tested with only one problem, a bucket of models can produce no better results than the best model in the set, but when evaluated across many problems, it will typically produce much better results, on average, than any model in the set.

One common approach used for model-selection is the cross-validation selection process (sometimes called a "bake-off contest"), which essentially tries all the models with the training set and picks the one that works the best. The cross-validation selection process can be implemented through following pseudo-code:

For each model m in the bucket:
Do c times: (where 'c' is some constant)
Randomly divide the training set into two datasets: A, B
Train m with A
Test m with B
Select the model that obtains the highest average score Gating is a generalization of cross-validation selection. It involves training another learning model to decide which of the models in the bucket is best-suited to solve the problem. Often, a perceptron (i.e., an algorithm for supervised learning of binary classifiers) is used for the gating model. It can be used to pick the "best" model, or it can be used to give a linear weight to the predictions from each model in the bucket. When a bucket of models is used with a large set of problems, it may be desirable to avoid training some of the models that take a long time to train. Landmark learning is a meta-learning approach that seeks to solve this problem. It involves training only the fast (but imprecise) algorithms in the bucket, and then using the performance of these algorithms to help determine which slow (but accurate) algorithm is most likely to do best.

Figure 6:
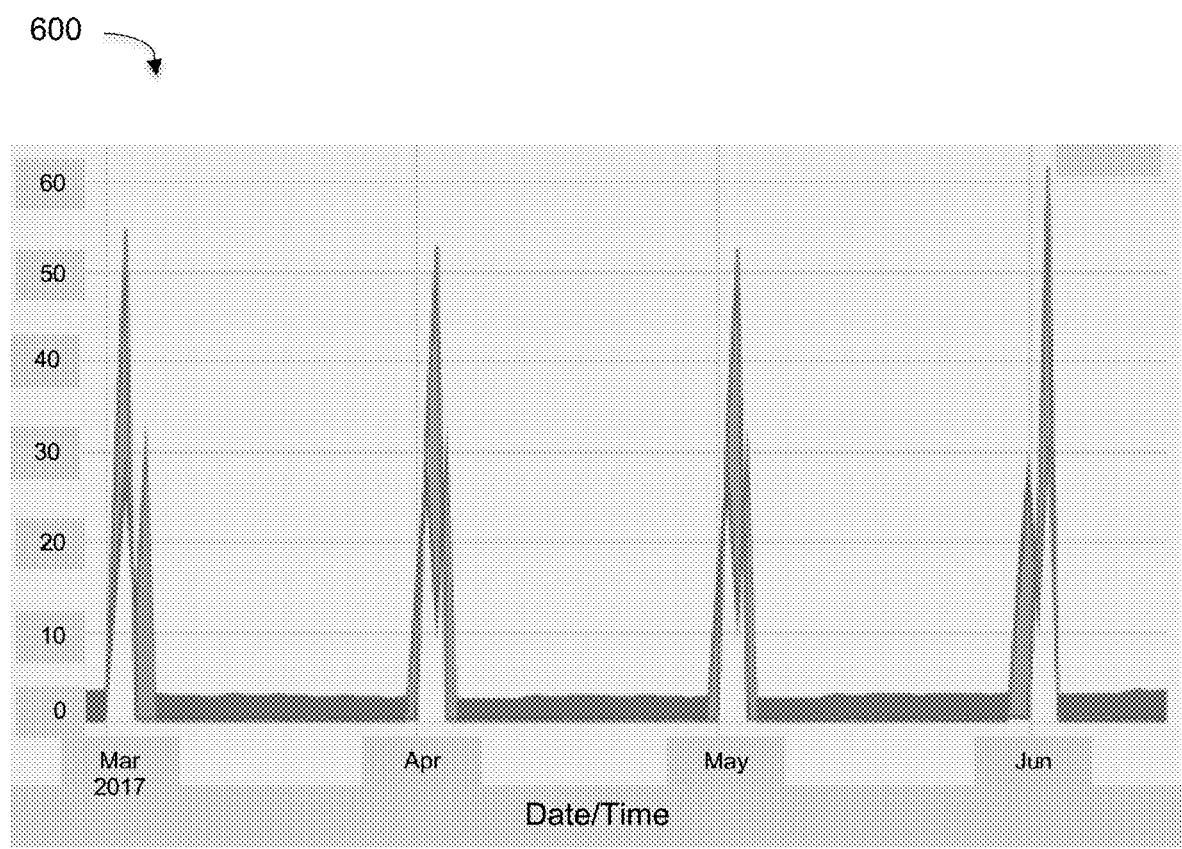
FIG. 6 illustrates time-series models for various forecasting models as may be used in a fast forward advance process, under some embodiments.

FIG. 6 illustrates time-series models for various forecasting models as may be used in a fast forward advance process, under some embodiments. For the example embodiment of FIG. 6, different time-series plots are shown of data flush size over a span of months in a particular year (e.g., 2017). For the example plots, specific peak usage or data traffic times are observed around the first of each month for a certain scale of data units (e.g., tens, hundreds, thousands, etc.). Thus, using this model, the models may lead to a prediction of similar peak usage times for each of the other months of the year. FIG. 6 is provided as an example of a time-series model plot and any other set of units and plot profiles may also be possible FIG. 6 is intended to show generally that a degree of seasonality can be found in the data. It provides an illustration of amount of data that needs to be icated across time, and it can be seen that in the first days of each month there is a significant amount of data that should be replicated. Models that measure seasonality will learn this behavior and predict this pattern in advance.

To track the behavior of the replication data size across time over different protected applications, any time series model can be selected (e.g., regression model, ARIMA, or neural networks). In an embodiment, a Holt-Winters model is used because of its simplicity and ease of updating the model in an online manner. Alternatively, an available forecast algorithm such as libraries for the Python and R programming languages may be used. The model fundamentally tracks three components of the signal: Level, Bias and Seasonality to provide a Forecast. Generally, the model uses the following time-series equations:

LEVEL: $L_t = \gamma(Y_t - S_{t-s}) + (1-\gamma)(L_{t-1} + B_{t-1})$

BIAS: $B_t = \beta(L_t - L_{t-1}) + (1-\beta)B_{t-1}$

SEASONALITY: $S_t = \gamma(Y_t - L_t) + (1-\gamma)S_{t-s}$

FORECAST: $F_{t+k} = L_t + kB_t + S_{t+k-s}$

In the above equations, $Y_t$ is the actual value at time t, and s is the length of the seasonal cycle. Further description of these above equations is provided in "The Analysis of Time Series: An Introduction", 6th Edition, Chris Chatfield, CRC Press, 19 Nov. 2013.

According to this model, the system can predict when next large data flush is about to happen, and will request from the system a temporary resource allocation to handle the coming flush.

As shown in FIG. 5B, the fast forward decision switch 506 receives the forecast results and confidence intervals from the analytics unit 504, as well as the free capacity on the Do stream 512. The free capacity on the Do stream 512 is one possible measure of system capacity that is monitored and fed to the fast forward switch 506 and analytics processes. Other system use measures may also be monitored and used by the switch, such as metrics in the physical hardware level (e.g., ESX level), among others.

In an embodiment, the analytics 504 and predictor modules 508 track the size of each or a sample of data flushes by within the system 200 by each or at least some of the sources in production site 202. The periodicity and granularity of the data gathering can be set by a system user or administrator, or defined within the analytics module itself. These parameters may be provided to the analytics module 504 in the form of defined parameters 514, which again may be internally or externally defined. in the form of Examples of periodicity include hourly, daily, weekly, or monthly tracking of data flushes. Other time periods may also be used depending on system configuration and constraints. The granularity (unit size) of the data flushes can also be defined, such as minimum data set size in MB (e.g., 10 MB) or block sizes (e.g., 50 blocks). A switch threshold value may be defined to determine when the fast forward switch 506 activates fast forward mode 510. This may also be provided as a defined parameter. This threshold value acts as a trigger to invoke the fast forward switch when a predicted data flush size reaches a certain value. For example, a data flush of 20 MB or more may be defined as the threshold value so that any predicted data flush over 20 MB invokes fast forward mode 510 earlier than otherwise might have occurred. Likewise, any predicted data flush less than this value would maintain no fast forward mode. The values given above are for example only, and any values are possible for a given a time frame. As a further example, if there is a Do Stream of size of 1 GB, with available system throughput of 6 GB/s, depending on many other factors, this may allow about 1 GB/s incoming replicated data, and therefore 1 GB/s data peak that causes the fast forward mode to be invoked.

Using the predicted data flush size as compared to the defined parameters, along with the system capacity, the fast forward switch 506 will then calculate if there is a need to switch the mode 510 to fast forward. Table 1 below illustrates some example states of the fast forward switch based on these factors.

TABLE 1

| PREDICTED FLUSH SIZE | DO STREAM | FAST FORWARD MODE |
| --- | --- | --- |
| Not Large | Free | OFF |
| Not Large | Full | OFF* |
| Too Large | Free | OFF* |
| Too Large | Full | ON |

As shown in Table 1 above, there are four possible conditions to set or not set the switch to enable fast forward mode, depending on whether the predicted flush size is too large and the Do stream is full or has free capacity. If the data flush size is small and the Do stream is free, then the switch will definitely be off, while if the data flush size is too large, as defined by the defined threshold value, and the Do stream is full, then the switch will definitely be on to enable the fast forward mode. The states where the flush size is not to large but the Do stream is full, or where the flush size is too large, but the Do stream is free will typically not enable the switch (FF mode off), however, the system may be configured to enable the switch in these cases. Alternatively, additional analytics data or models may be used to fine tune the analytics to further analyze the situation do determine the fast forward switch state in these cases. For example, if the flush size is trending down versus up, or if the Do stream is filling or emptying, and so forth.

In embodiment, certain user interface tools may be provided to allow the user change various parameter thresholds, and to modify the thresholds for different applications independently, such as the minimum confidence level for switching to fast forward mode, flush minimum sizes, and so on. The system may be configured such that the user can prioritize applications differently, and choose thresholds according to various properties, such as application priority, application type, VM Operating system. Elements that the user might want to control include the minimum confidence level for switching to fast forward, and flush minimum size. Considering that different applications might flush concurrently, moving to fast forward in one application could save enough resources to avoid fast forward in the other application. Application prioritization is another input in deciding for which application to fast forward in advance. That is, if both applications have a similar flush size, the system can for instance fast forward the lower priority application, so that the higher priority application has more resources to continue replication and try to handle the incoming I/Os without losing the journal (i.e., without having to move to fast forward mode eventually).

Figure 7:
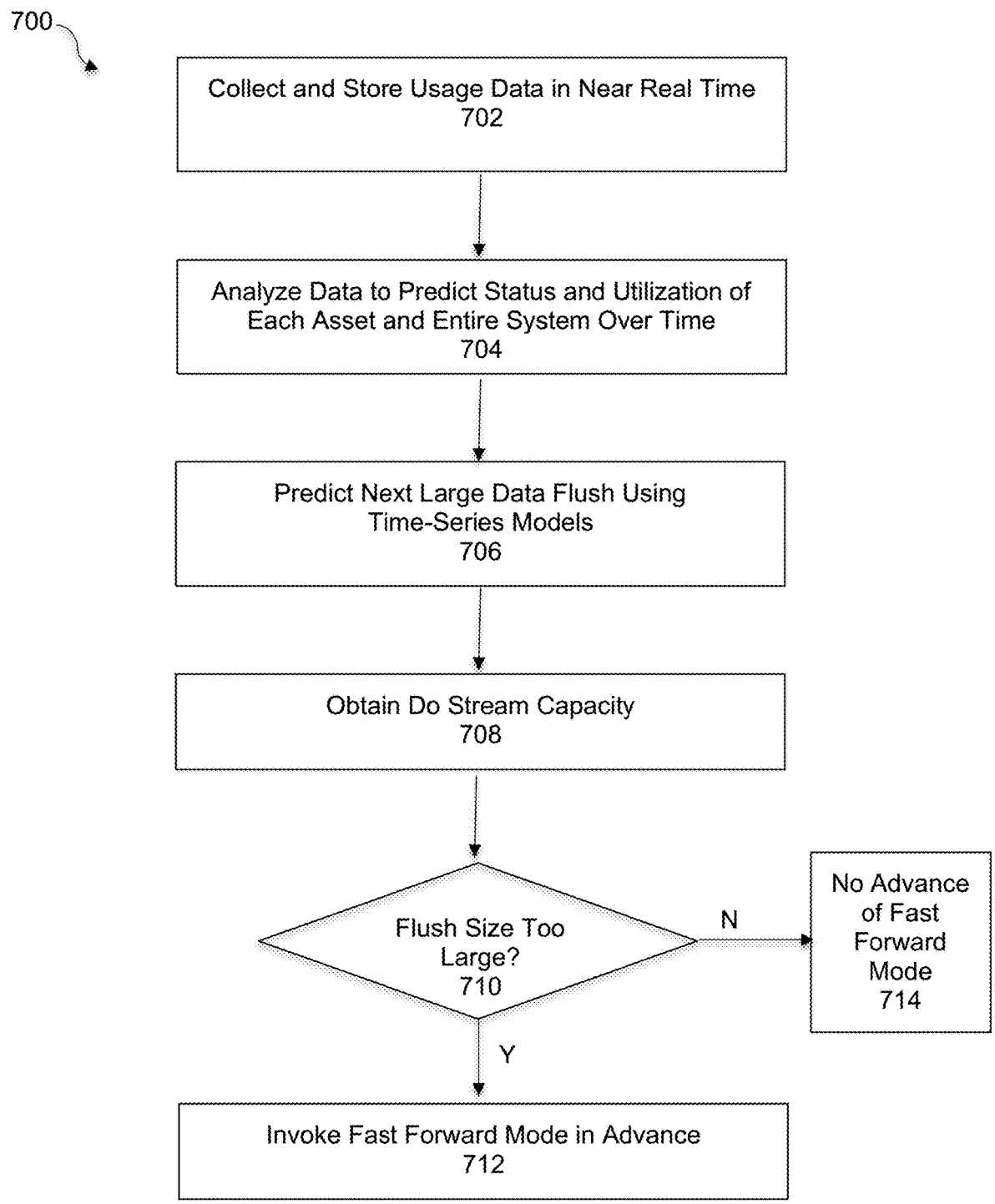
FIG. 7 is a flowchart that illustrates an overall method of performing machine learning based advanced fast forward in large data flush situations, under some embodiments.

FIG. 7 is a flowchart that illustrates an overall method of performing machine learning based advanced fast forward in large data flush situations, under some embodiments. As shown in FIG. 7, process 700 starts by collecting and storing usage data in near real time, step 702. Such usage data typically includes data flush sizes, statistics, and patterns. That is, the amount of flushed data per unit time, periodicity of large size data flushes, and so on. The relevant parameters such as periodicity and granularity for the collected data can be defined internally within the system or externally by users, administrators, analysts, and so on.

The collected data is then analyzed using certain machine learning or artificial intelligence techniques, step 704. The data is analyzed on the basis of each individual asset or resource within the system and the system as a whole to determine certain usage trends with respect to the data flush operations. Most important is the analysis of peak data flush sizes based on time and/or resource. This analysis is then used to predict the next large data flush using time-series or other relevant models, step 706. The size of the data flushes is one factor in the input to the fast forward switch. In an embodiment, the other factor is the Do stream capacity at a particular time, which is determined in step 708. If the flush size is too large (such as above a defined threshold) for the present Do stream capacity, as determined in step 710, the fast forward mode is invoked, 712. Otherwise, the fast forward mode is not used at the present time, step 714. This process 700 can be repeated on a periodic basis, such as defined by normal data replication cycles. Alternatively, it may be performed as needed or on-demand.

Embodiments include a solution for redundant writes in fast forward mode systems that uses machine learning and time-series analysis to optimize the use of fast forward replication in large data flush situations. This approach avoids redundant data writing to the journal, skipping steps that are predicted to be irrelevant that may stress the entire environment, affecting other applications and shortening disk life time. Moving to fast forward mode in advance can also allow other protected applications to avoid moving to FF themselves, thus losing their journal.

Block Storage Allocation Module

In general, the size of the Do Stream is typically a static percentage of the journal, which poses certain problems. The first problem is an inability to handle large flushes. When the Do stream size is static for each application, any time that application has a flush of incoming IOs (larger than the Do stream), the system must move to fast-forward and lose all the journal history. Although it is possible to move to fast forward mode in advance to avoid wasting resources, as described above, it is often better to avoid fast forward mode altogether when possible. A second problem is unutilized space in the static stream allocation. Much of the time, the replication system can handle the I/O rate of a certain application, such as by reading I/Os from the Do Stream almost as soon as they are written, or even caching them in-memory and skipping the Do Stream altogether. This, however, can lead to a large percentage of the Do Stream space being unused most of the time. A third problem is unutilized space in dynamic stream allocation based on greedy algorithms. The on-demand dynamic allocation of pages for the Do stream can theoretically help with the problem of unutilized space in the static stream allocation described above, but due to the greedy nature, two (or more) applications that are currently flushing data may require more space than is available, and both may end up in fast-forward mode.

Figure 8:
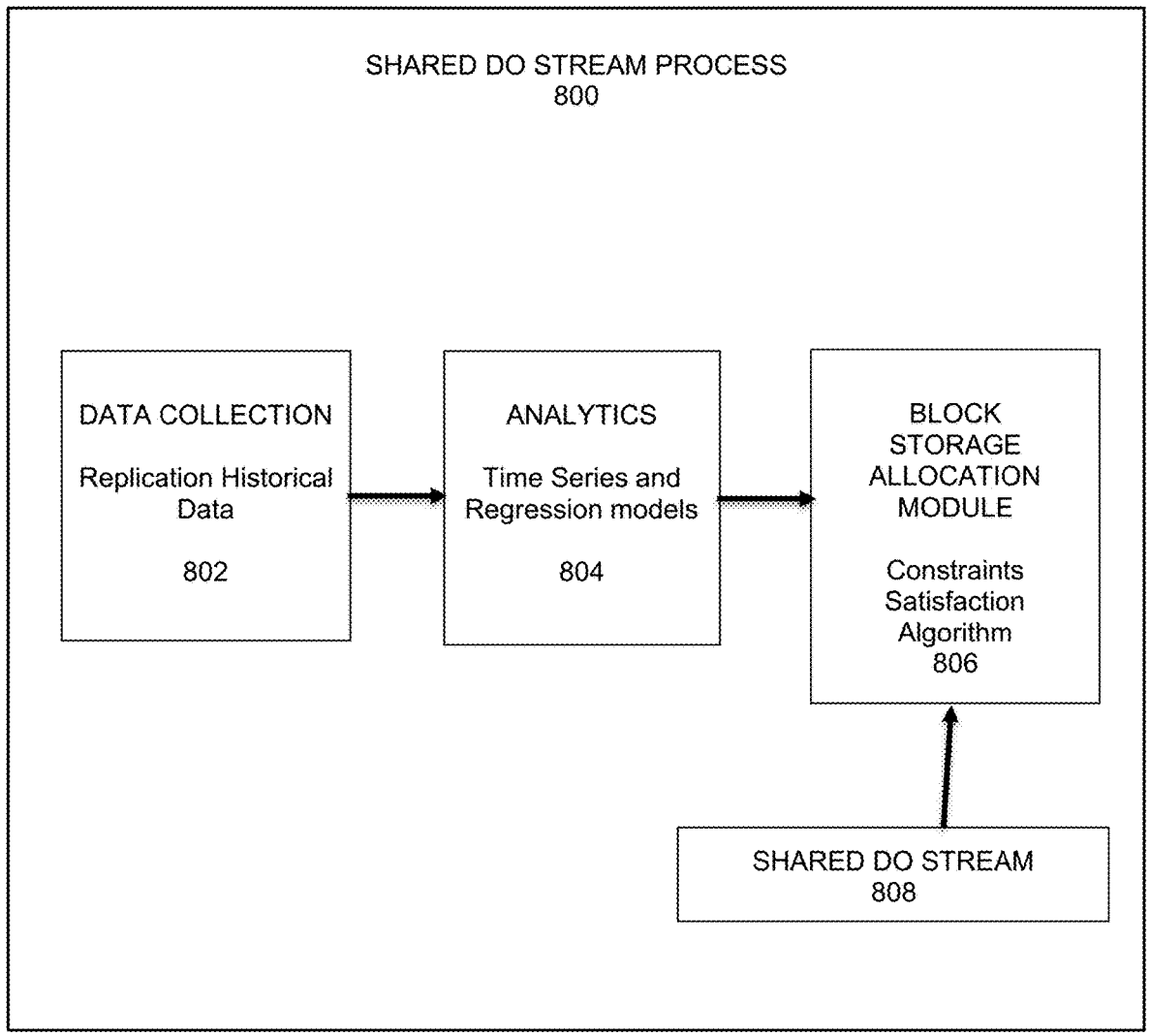
FIG. 8 illustrates a block diagram of a shared Do stream processing component, under some embodiments.

Embodiments include a shared Do stream approach to address these problems. FIG. 8 illustrates a block diagram of a shared Do stream processing component, under some embodiments. As shown in FIG. 8, the shared Do stream process or component comprises a near real-time data collection component, as may be implemented as described above with respect to FIG. 5B, and a bucket of analytical modules that are applied over the historical data points and allows accurate forecasting (model competition), also as described above with respect to FIG. 5B. Component 800 also includes a block storage allocation module 806, which receives the forecast results and its confidence intervals from the analytics module 804 as well as the actual free capacity on the shared Do stream 808. It will then use a constraints satisfaction algorithm to accept or deny allocation requests for each application being replicated.

Figure 9:
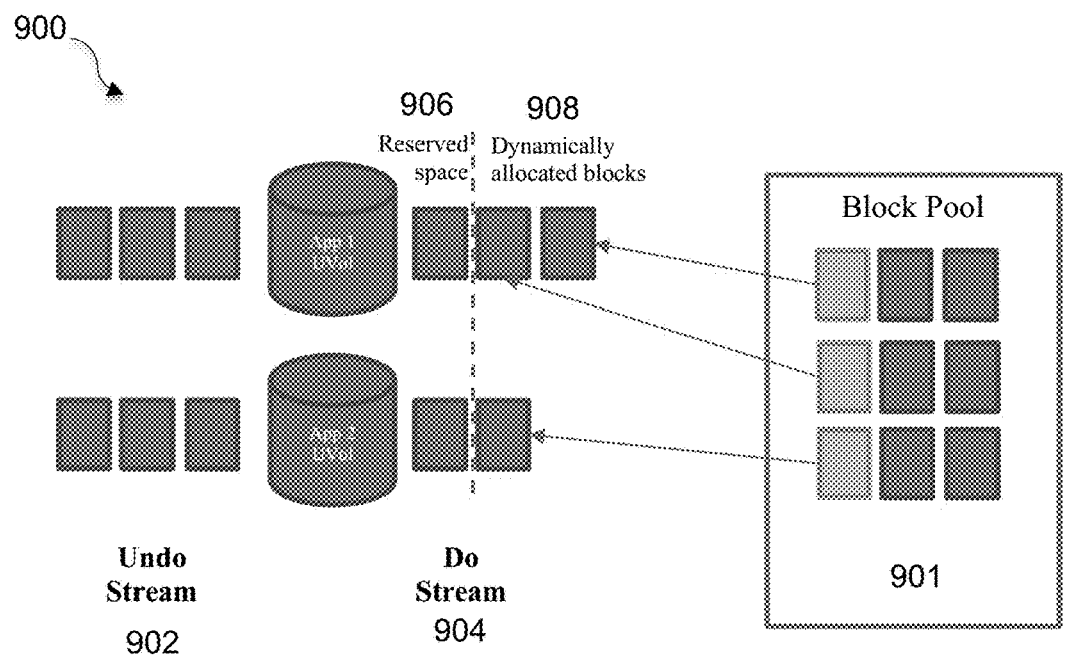
FIG. 9 illustrates a block storage allocation module, under some embodiments.

FIG. 9 illustrates a block storage allocation module, under some embodiments. As shown in diagram 900 of FIG. 9, two applications denoted App1 and App2 generate respective Do streams 904 and Undo streams 902. The Do streams have a certain amount of reserved space 906. They also have space 908 for dynamically allocated blocks, which are provided by shared block pool 901.

FIG. 9 is provided for example only, and any number of applications, App1 to AppN, are possible. Additionally, the size of the Do and Undo streams may be configured to be of any appropriate size with respect to the number of blocks in each stream. In an embodiment, the user will have the ability to set or modify the thresholds for different applications independently, such as reserving space for each protected application (or replicated VM), and the percentage of the entire available blocks in the shared block pool 901. In FIG. 9, the dynamically allocated blocks 908 were not originally present, but were assigned by the system in order to fulfil a predicted requirement for journal capacity. These blocks can later be removed from the journal and placed back in the block pool 901, such as after a flush of I/Os is handled and the predicted journal requirement is low. The amount of reserved space is dynamically configurable to make sure that each application will receive at least a minimum amount of journal space, even if all of the block pool 901 is in use by other protected application journals.

Following is an example scenario described with respect to the two replicated applications, App1 and App2 in FIG. 9. For this example scenario, assume that each of the two applications experiences a flush of I/O that is too large for both static Do stream journal and for greedy algorithms allocating space on demand.

Figure 10A:
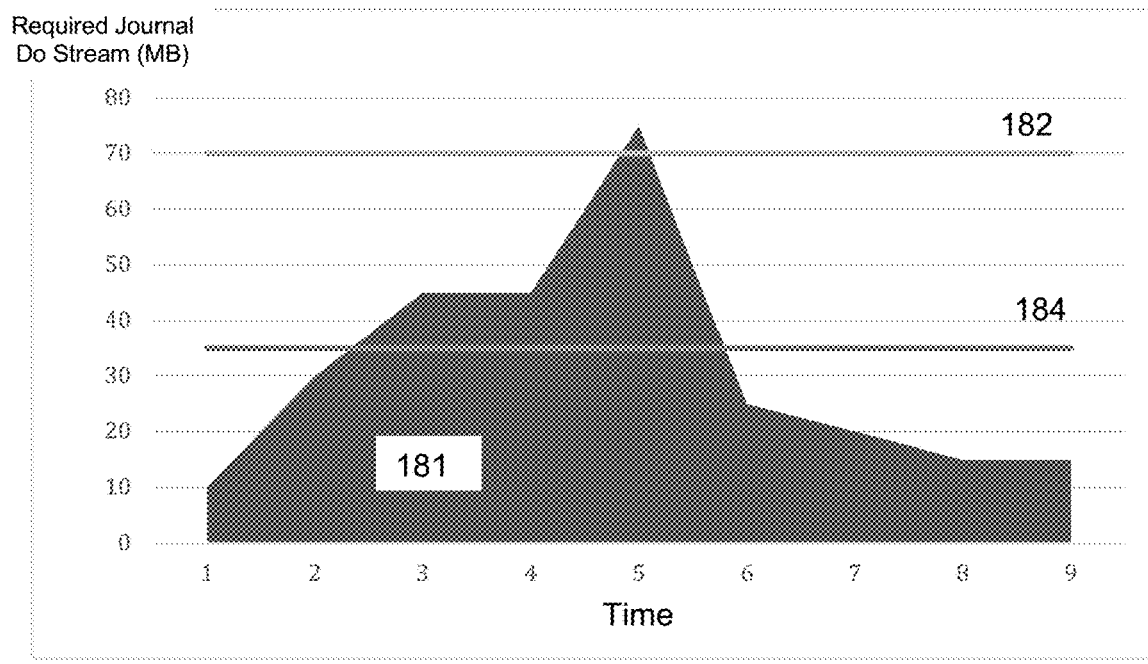
FIG. 10A shows the expected Do stream space requirement over time for a first application, under an example embodiment.

FIG. 10A shows the expected Do Stream space requirement over time for the first application (App1). Thus, the vertical axis is the required journal Do stream in MB versus time in appropriate time units (horizontal axis). Area 181 represents the size of the required Do stream (in MB) per unit time in an example execution period, line 184 represents the static limit of App1 and line 182 represents the shared stream limit. It can be seen that at timestamp 5, the application requires more space than is available overall, so any attempt to replicate it is futile. If the prediction from the analytics module is accurate, the system will need to move to fast-forward mode, and thereby lose the journal eventually, even if all resources are allocated to App 1.

Figure 10B:
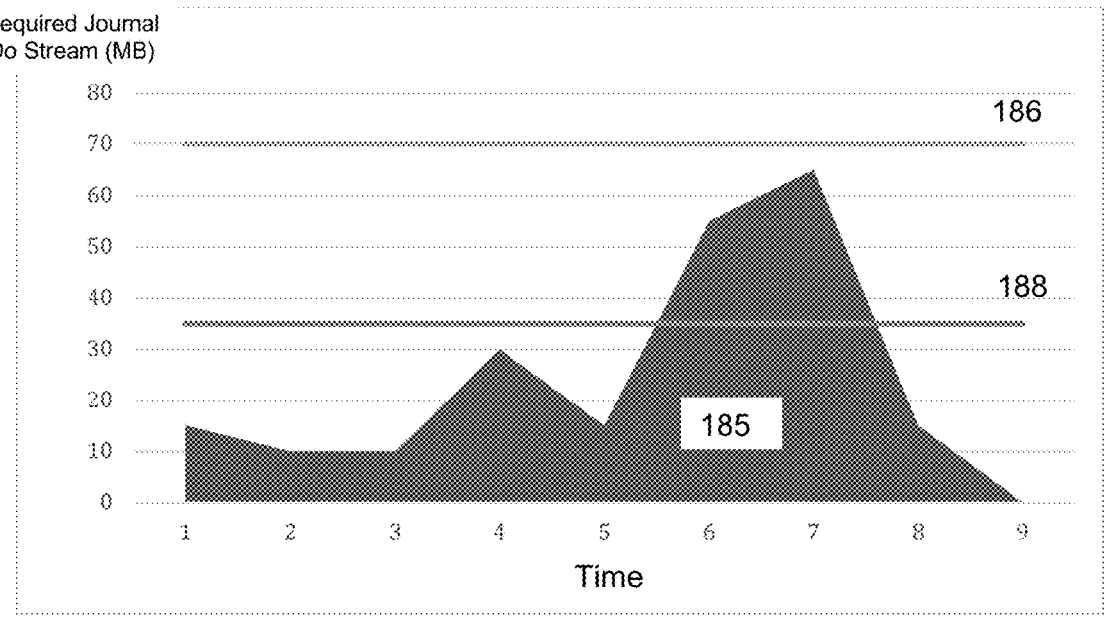
FIG. 10B shows the expected Do stream space requirement over time for a second application, under an example embodiment.

FIG. 10B shows the expected Do stream space requirement over time for the second application (App2), under an example embodiment. Area 182 represents the size of the required Do stream (in MB) per unit time in an example execution period, line 188 represents the static limit of App2 and line 186 represents the shared stream limit. In this FIG., it can be seen that while App2 exceeds the static allocation requirement in timestamp 6, this application never exceeds the overall available space as defined by the shared stream limit line 186, therefore it is possible to keep it at five-phase replication at all times of the period of FIG. 10B.

Figure 10C:
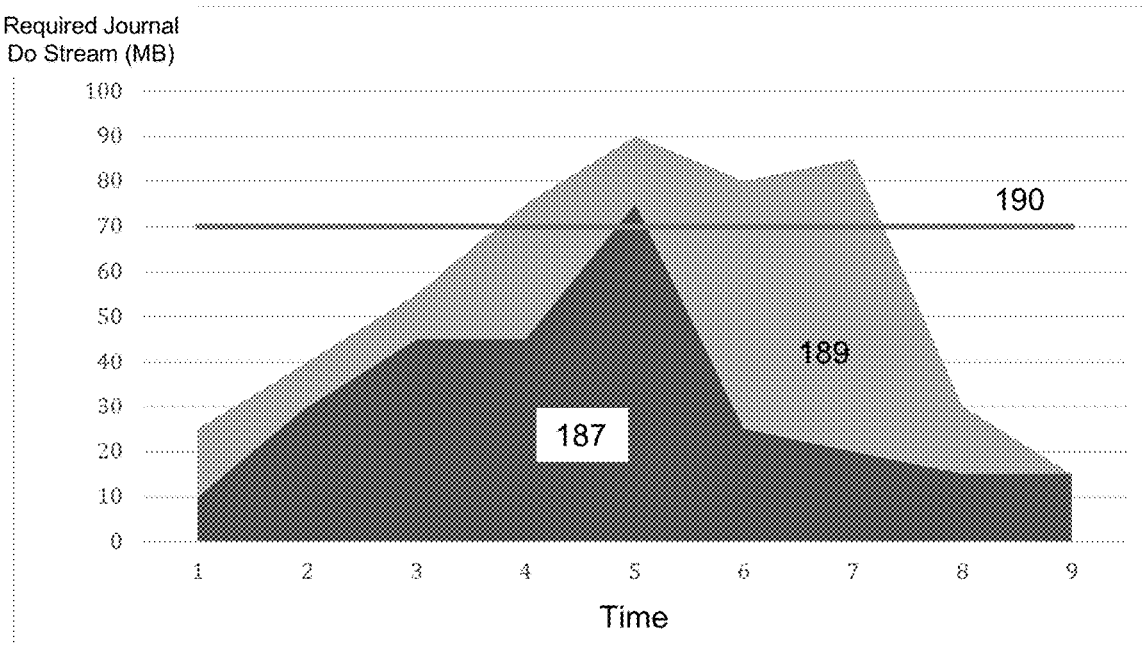
FIG. 10C shows the combined Do stream space requirement for the applications of FIGS. 10A and 10B, under the example embodiment.

FIG. 10C shows the combined Do stream space requirement for the applications of FIGS. 10A and 10B, under the example embodiment. FIG. 10C shows the two applications' storage requirements stacked on top of each other to graphically show the total storage requirement required for replicating). Area 187 represents the size of the required Do stream (in MB) per unit time for App1 and area 189 represents the required size for App2 in an example execution period, and line 189 represents the shared stream limit. In FIG. 10C, it can be seen that at timestamp 4, the requirement 187 for App1 is below line 190 and that for App1, 189, is above this line. Thus, a greedy algorithm will deny App2's request for space because the overall limit was exceeded. At later timestamp 5 App1's request will also be denied as area 187 is above line 190 at this point. This will result in both applications, at timestamp 5, moving to fast-forward mode and thus losing all their replicated history.

In an embodiment, the constraints satisfaction algorithm of the block storage allocation module is used to optimize the Do stream allocation between these replicated applications to avoid unnecessary journal losses. In this example embodiment, App1's request for space can be denied as early as the confidence level for the storage requirements in timestamp 5 are high enough (i.e., even at timestamp 1 or 2), thus allowing App2 to continue replicating as normal without being denied at timestamp 5.

The shared Do stream process 123 dynamically allocates journal space for Do streams 904 across the multiple applications. This provides a certain buffering of the data flush, using space that would normally be allocated for, but unused by, other applications, thus preventing the need to move to fast-forward mode when possible. As described above, certain machine learning techniques are used in order to predict the required Do stream for each application according to past experience with the application, and this prediction is used to intelligently allocate Do Streams between the different applications.

In an embodiment, the defined shared stream limit (e.g., lines 182, line 186, and line 190) are static thresholds defined by the system. Alternatively, they may be thresholds set by an administrator or by the system itself. The thresholds may also be dynamic thresholds instead of static thresholds.

The shared Do Stream process 123 with a prediction model provided by machine learning for fast-forward mode process 121 thus optimizes Do Stream allocation between replicated applications, and avoid unnecessary journal losses, and also helps reduce the total storage requirements for replicating multiple applications.

Figure 11:
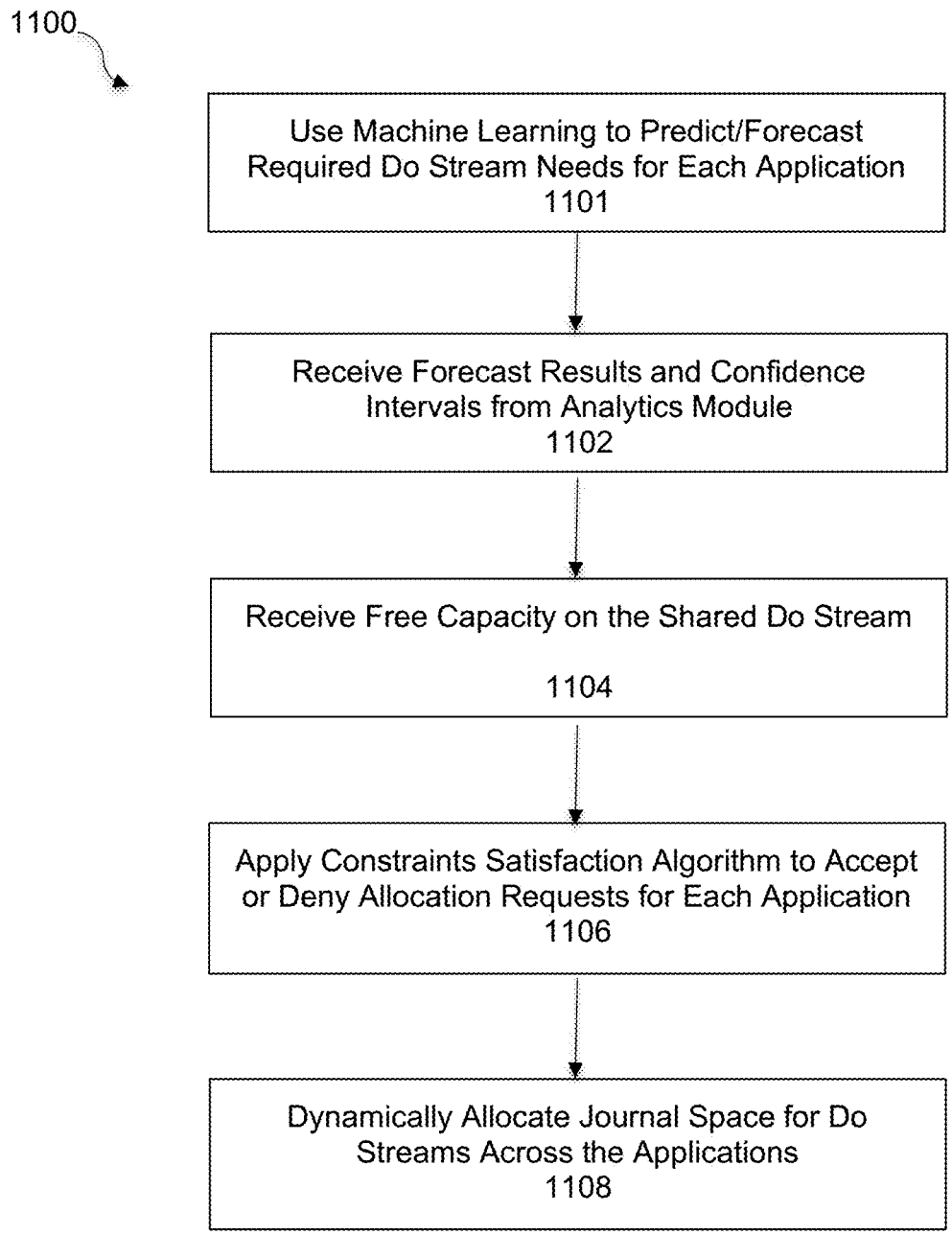
FIG. 11 is a flowchart that illustrates a method of share Do stream processing under some embodiments.

FIG. 11 is a flowchart that illustrates a method of shared Do stream processing under some embodiments. Process 1100 begins by using machine learning processes in an analytics module to predict or forecast the required Do stream needs for each application of any number of applications to be replicated, step 1101. The Do stream process receives the forecast results and confidence intervals from the analytics module, step 1104. The shared Do stream process also receives the free capacity, step 1104. It then applies a constraints satisfaction algorithm to accept or deny allocation requests for each application, step 1106. As application execution continues, the process dynamically allocates journal space for the Do streams across the applications to thereby redistribute unused space among the applications to prevent, as much as possible, the applications from moving to fast-forward mode.

System Implementation

Figure 12:
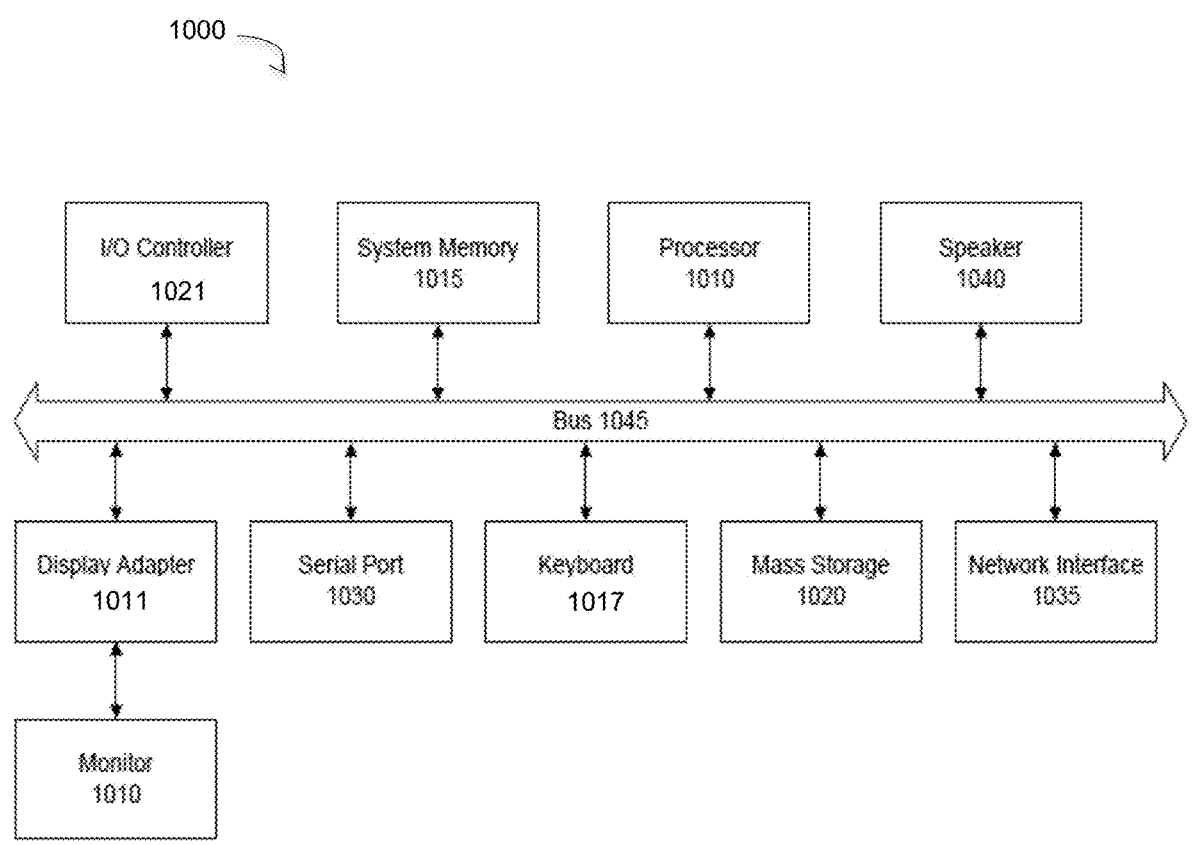
FIG. 12 is a block diagram of a computer system used to execute one or more software components of an advanced fast forward system for data replication, under some embodiments.

As described above, in an embodiment, system 100 includes an advance fast forward mode module 121 with shared Do stream module 123 that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet similar large-scale network or portion thereof. Each node in the network(s) comprises a computing device capable of executing software code to perform the processing steps described herein. FIG. 12 is a block diagram of a computer system used to execute one or more software components of an advanced fast forward system for data replication, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 12 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of allocating replication journal space among multiple applications in a computer backup system, comprising:
   collecting data usage statistics of the applications;
   analyzing the collected data using machine learning processes to determine certain usage trends with respect to data flush operations of the applications;
   predicting a required Do stream usage of each application based on the analyzed data;
   obtaining a capacity of a journal storage space used for new incoming write operations to a storage device in the system; and
   dynamically allocating journal space for respective Do streams of the applications by assigning unused journal space from one application to another application that has predicted usage requirements exceeding a defined threshold in order to prevent at least one application from moving to fast-forward replication mode and thereby losing its Undo journal information.

2. The method of claim 1 wherein the Do stream for each application comprises a certain amount of reserved space, and a space for dynamically allocated blocks.

3. The method of claim 2 wherein the dynamically allocated blocks are assigned to a respective application from a block pool.

4. The method of claim 3 further comprising receiving user input specifying the amount of reserved space and a percentage of entire available blocks in the block pool.

5. The method of claim 3 wherein the fast-forward replication mode is invoked for an application when a required journal Do stream capacity for the application exceeds a defined shared stream limit.

6. The method of claim 1 wherein the fast forward mode is invoked if a predicted next flush size is too large relative to the capacity of the Do stream, and wherein the fast forward mode to not retain input/output (I/O) history data for undo operations as Undo data during a replication operation to the storage device in order to save resources in the system.

7. The method of claim 6 wherein the invoked fast forward mode changes a five-phase replication process for data replication from a data source to the data storage to a three-phase replication process that does not store metadata tracking input/output operations to the data storage for undo processes to roll-back the tracked input/output operations.

8. The method of claim 1 wherein the predicting step uses time-series models and linear regression models fitted to a give training dataset and then validated and evaluated on a given test dataset.

9. The method of claim 8 wherein a best model that minimizes an error function outcome is used for the prediction.

10. An apparatus allocating replication journal space among multiple applications in a computer backup system, comprising:
    an analyzer collecting data usage statistics of the applications and analyzing the collected data using machine learning processes to determine certain usage trends with respect to data flush operations of the applications;
    a machine learning component predicting a required Do stream usage of each application based on the analyzed data; and
    a block allocation component obtaining a capacity of a journal storage space used for new incoming write operations to a storage device in the system, and dynamically allocating journal space for respective Do streams of the applications by assigning unused journal space from one application to another application that has predicted usage requirements exceeding a defined threshold in order to prevent at least one application from moving to fast-forward replication mode and thereby losing its Undo journal information.

11. The apparatus of claim 10 wherein the Do stream for each application comprises a certain amount of reserved space, and a space for dynamically allocated blocks.

12. The apparatus of claim 11 wherein the dynamically allocated blocks are assigned to a respective application from a block pool.

13. The apparatus of claim 12 further comprising receiving user input specifying the amount of reserved space and a percentage of entire available blocks in the block pool.

14. The apparatus of claim 13 wherein the fast-forward replication mode is invoked for an application when a required journal Do stream capacity for the application exceeds a defined shared stream limit.

15. The apparatus of claim 10 wherein the fast forward mode is invoked if a predicted next flush size is too large relative to the capacity of the Do stream, and wherein the fast forward mode to not retain input/output (I/O) history data for undo operations as Undo data during a replication operation to the storage device in order to save resources in the system.

16. The apparatus of claim 15 wherein the invoked fast forward mode changes a five-phase replication process for data replication from a data source to the data storage to a three-phase replication process that does not store metadata tracking input/output operations to the data storage for undo processes to roll-back the tracked input/output operations.

17. The apparatus of claim 16 wherein the predicting step uses time-series models and linear regression models fitted to a give training dataset and then validated and evaluated on a given test dataset.

18. The apparatus of claim 17 wherein a best model that minimizes an error function outcome is used for the prediction.

19. A computer program product, comprising a non-transitory computer-readable medium having a computer-readable program code embodied therein, the computer-readable program code adapted to be executed by one or more processors to perform a method of allocating replication journal space among multiple applications in a computer backup system, comprising:
   collecting data usage statistics of the applications;
   analyzing the collected data using machine learning processes to determine certain usage trends with respect to data flush operations of the applications;
   predicting a required Do stream usage of each application based on the analyzed data;
   obtaining a capacity of a journal storage space used for new incoming write operations to a storage device in the system; and
      dynamically allocating journal space for respective Do streams of the applications by assigning unused journal space from one application to another application that has predicted usage requirements exceeding a defined threshold in order to prevent at least one application from moving to fast-forward replication mode and thereby losing its Undo journal information.

20. The computer program product of claim 19 wherein the Do stream for each application comprises a certain amount of reserved space, and a space for dynamically allocated blocks, and the dynamically allocated blocks are assigned to a respective application from a block pool.

* * * * *